United States Patent
Pignataro et al.

(10) Patent No.: US 10,237,175 B2
(45) Date of Patent: Mar. 19, 2019

(54) ENTROPY PREFIX SEGMENT IDENTIFIER FOR USE WITH ENTROPY LABEL IN SEGMENT ROUTING NETWORKS

(71) Applicant: CISCO TECHNOLOGY, INC., San Jose, CA (US)

(72) Inventors: Carlos M. Pignataro, Raleigh, NC (US); Clarence Filsfils, Brussels (BE); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 15/409,249

(22) Filed: Jan. 18, 2017

(65) Prior Publication Data

US 2018/0205641 A1    Jul. 19, 2018

(51) Int. Cl.
| H04L 12/28 | (2006.01) |
|---|---|
| H04L 12/723 | (2013.01) |
| H04L 12/721 | (2013.01) |
| H04L 12/803 | (2013.01) |

(52) U.S. Cl.
CPC ............ H04L 45/507 (2013.01); H04L 45/38 (2013.01); H04L 47/125 (2013.01)

(58) Field of Classification Search
None
See application file for complete search history.

(56) References Cited

U.S. PATENT DOCUMENTS

| 9,178,810 | B1 * | 11/2015 | Singh | H04L 45/50 |
|---|---|---|---|---|
| 9,660,897 | B1 * | 5/2017 | Gredler | H04L 45/50 |
| 2014/0169370 | A1 * | 6/2014 | Filsfils | H04L 69/166 370/392 |
| 2014/0254596 | A1 * | 9/2014 | Filsfils | H04L 45/745 370/392 |
| 2014/0269721 | A1 * | 9/2014 | Bashandy | H04L 41/12 370/392 |
| 2014/0269725 | A1 * | 9/2014 | Filsfils | H04L 41/12 370/392 |
| 2014/0317259 | A1 * | 10/2014 | Previdi | H04L 61/30 709/223 |
| 2014/0369356 | A1 * | 12/2014 | Bryant | H04L 45/745 370/392 |
| 2015/0003255 | A1 * | 1/2015 | Frost | H04L 45/24 370/238 |

(Continued)

OTHER PUBLICATIONS

IETF RFC 6790 "The Use of Entropy Labels in MPLS Forwarding", K. Kompella et al., Nov. 2012.

(Continued)

*Primary Examiner* — Kwang B Yao
*Assistant Examiner* — Juvena W Loo
(74) *Attorney, Agent, or Firm* — Cindy Kaplan

(57) ABSTRACT

In one embodiment, a method includes receiving at an ingress node in a segment routing network, an entropy prefix segment identifier, generating a label stack comprising the entropy prefix segment identifier and an entropy label beneath the entropy prefix segment identifier, and transmitting a packet comprising the label stack using the entropy prefix segment identifier as a transport label and an entropy label identifier. An apparatus and logic are also disclosed herein.

20 Claims, 11 Drawing Sheets

(56) References Cited

U.S. PATENT DOCUMENTS

| | | | |
|---|---|---|---|
| 2015/0029849 A1* | 1/2015 | Frost | H04L 47/125 370/235 |
| 2015/0030020 A1* | 1/2015 | Kini | H04L 45/28 370/389 |
| 2015/0109904 A1* | 4/2015 | Filsfils | H04L 45/22 370/221 |
| 2015/0109907 A1 | 4/2015 | Akiya et al. | |
| 2015/0222531 A1* | 8/2015 | Budhia | H04L 45/507 370/400 |
| 2015/0256456 A1* | 9/2015 | Previdi | H04L 45/745 370/392 |
| 2015/0263940 A1* | 9/2015 | Kini | H04L 45/50 370/236.2 |
| 2015/0381406 A1* | 12/2015 | Francois | H04L 41/00 370/218 |
| 2016/0087884 A1* | 3/2016 | Xu | H04L 12/4633 370/392 |
| 2016/0261492 A1* | 9/2016 | Xiao | H04L 41/0686 |
| 2017/0063783 A1* | 3/2017 | Yong | H04L 67/2814 |

OTHER PUBLICATIONS

IETF Internet—Draft "Entropy labels for source routed tunnels with label stacks", draft-ietf-mpls-spring-entropy-label-04, S. Kini et al., Jul. 8, 2016.

* cited by examiner

ENTROPY PREFIX SEGMENT IDENTIFIER FOR USE WITH ENTROPY LABEL IN SEGMENT ROUTING NETWORKS

TECHNICAL FIELD

The present disclosure relates generally to communication networks, and more particularly, to entropy label in segment routing networks.

BACKGROUND

Segment Routing (SR) architecture leverages source routing and tunneling paradigms and can be directly applied to an MPLS (Multiprotocol Label Switching) data plane. Entropy label is a technique they may be used in MPLS to improve load balancing.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
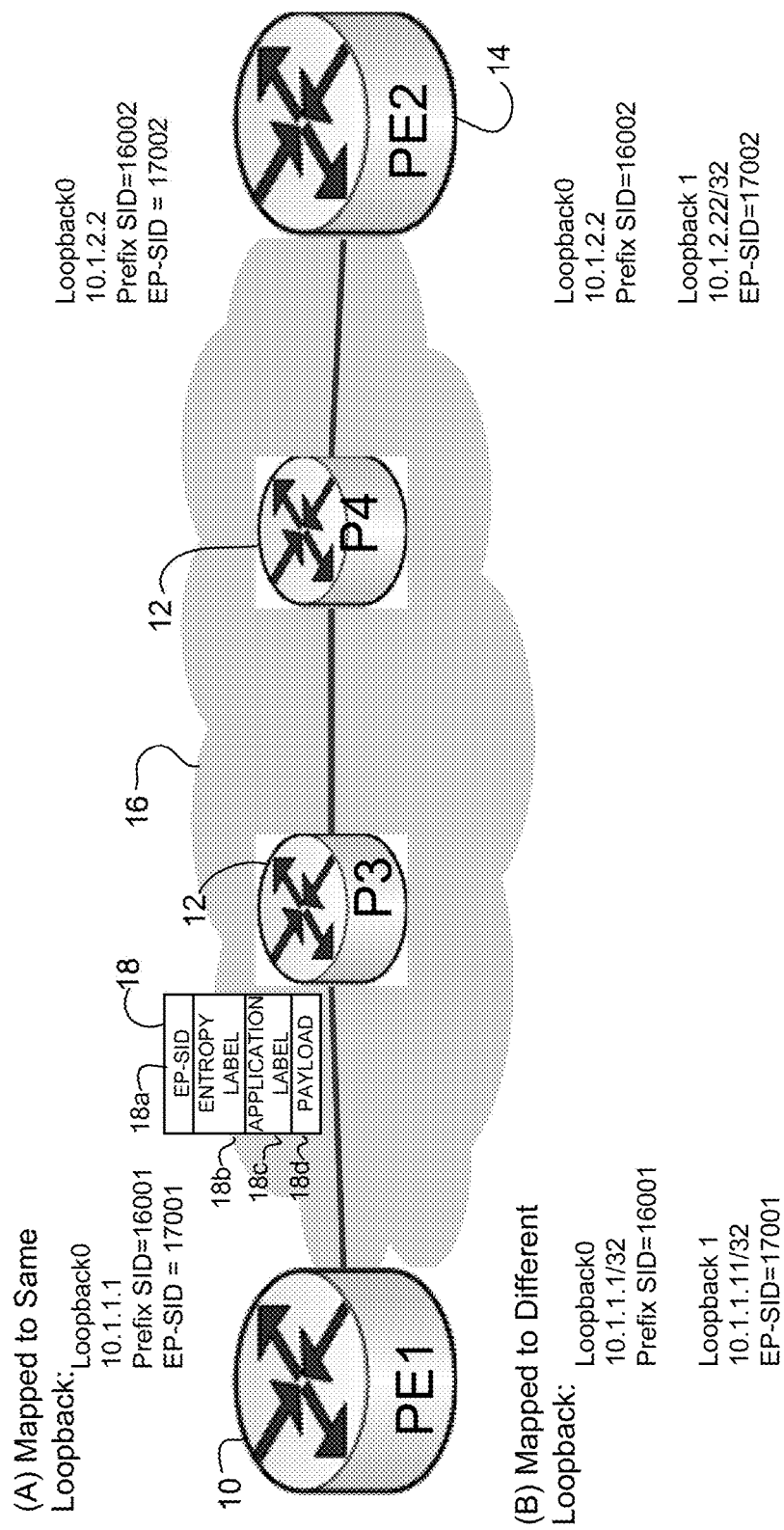
FIG. 1 illustrates an example of a network in which embodiments described herein may be implemented.

In one embodiment, a method generally comprises receiving at an ingress node in a segment routing network, an entropy prefix segment identifier, generating a label stack comprising the entropy prefix segment identifier and an entropy label beneath the entropy prefix segment identifier, and transmitting a packet comprising the label stack using the entropy prefix segment identifier as a transport label and an entropy label identifier.

In another embodiment, an apparatus generally comprises an interface for receiving at an ingress node in a segment routing network, an entropy prefix segment identifier, a processor for generating a label stack comprising the entropy prefix segment identifier and an entropy label beneath the entropy prefix segment identifier and transmitting a packet comprising the label stack using the entropy prefix segment identifier as a transport label and an entropy label identifier. The apparatus further comprises memory for storing the entropy prefix segment identifier.

In yet another embodiment, logic is encoded on one or more non-transitory computer readable media for execution and when executed operable to process at an ingress node in a segment routing network, an entropy prefix segment identifier, generate a label stack comprising the entropy prefix segment identifier and an entropy label beneath the entropy prefix segment identifier, and transmit a packet comprising the label stack using the entropy prefix segment identifier as a transport label and an entropy label identifier.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Traffic may be balanced across a network through the use of Equal-Cost Multi-Path (ECMP), for example, by allowing traffic to take multiple paths to reach a destination. ECMP may be used between two nodes that are separated by one or more hops. Load balancing may take place over several shortest paths in the network, which may be obtained, for example, by arranging IGP (Interior Gateway Protocol) metrics to define at least two equal cost paths. Packets belonging to a given flow are mapped to the same path. A node may use specified fields within a packet's header called keys, as input to a load balancing algorithm. Due to encapsulation in MPLS networks, transit nodes may need to perform deep packet inspection (DPI) of packets to find these keys. In order to eliminate the need for deep packet inspection, an ingress node may extract the appropriate keys from a given packet, input them to its load balancing algorithm, and place the result in a label called an entropy label as part of the MPLS label stack pushed onto the packet.

The entropy label is a special load balancing label that enhances a node's ability to load balance traffic across ECMP or link aggregation groups (LAGs), for example. The entropy label allows nodes to efficiently load balance traffic using just the label stack rather than deep packet inspection. For example, an ingress PE (Provider Edge) router may perform hashing on various key fields and populate the entropy label, which may be used by transit nodes for load balancing without the need for deep packet lookup for keys. This eliminates the need for transit nodes to perform DPI into the IP (Internet Protocol)/transport header for load balancing. An entropy label may be, for example, any value in a 20-bit label range, as described in IETF (Internet Engineering Task Force) RFC (Request for Comments) 6790, "The Use of Entropy Labels in MPLS Forwarding", K. Kompella et al., November 2012. The entropy label range may overlap with another label range, therefore, in conventional systems, a special label referred to as an entropy label indicator (ELI) is inserted before the entropy label. The ELI is a reserved label and avoids misuse of the entropy label for incorrect forwarding.

The entropy label results in an additional cost in terms of performance. It increases the label stack size by a minimum of two (ELI+EL) in conventional systems. Furthermore, multiple POP operations (minimum of three for ELI+EL+ application label) are needed at an egress PE. This problem is compounded for Segment Routing (SR) networks because of the stack labels that are popped along the way.

Segment Routing differs from other MPLS control plane protocols, in that segment assignment is not on a hop-by-hop basis. A node steers a packet through a controlled set of instructions called segments, by prepending the packet with an SR header. Rather than depending on a hop-by-hop signaling technique, SR depends on a set of segments that are advertised by a routing protocol. These segments act as topological sub-paths that can be combined together to form a desired path.

In segment routing networks, different nodes or linecards may have varying Readable Label Depth (RLD). Thus, in conventional systems multiple ELI/EL may be needed to be positioned in a label stack so that any transit node will be able to read at least one entropy label. This significantly increases label stack size by two labels for each such position. Furthermore, transit nodes may need to perform multiple POP operations.

The embodiments described herein provide an Entropy Prefix Segment Identifier (EP-SID) that has a combined semantic of label forwarding and entropy label identifier. This eliminates the need for ELI and helps significantly reduce the label stack size in segment routing environments.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

In the simplified example shown in FIG. 1, a network comprises four network devices, a provider edge node (PE1) 10 operating as an ingress node, two transit nodes (P3, P4) 12 and an egress node (PE2) 14 in communication over a network 16. The network 16 may include one or more network segments that implement MPLS (Multiprotocol Label Switching).

The network devices 10, 12, 14 may comprise routers or other network devices comprising network routing elements configured to perform forwarding functions. The network devices 10, 12, 14 may comprise routing processes operable to perform functions provided by one or more routing protocols, such as Interior Gateway Protocol (IGP) (e.g., Open Shortest Path First (OSPF), Intermediate System-to-Intermediate System (IS-IS)), Border Gateway Protocol (BGP), etc. These functions may be configured to manage a forwarding information base (e.g., LFIB (Label Forwarding Information Base)) containing data used to make forwarding decisions.

Packets may be transmitted within the network via a Label Switched Path (LSP). Packets may enter the network via ingress node 10, travel along an LSP of one or more core (transit) nodes 12 and exit via egress node 14. The ingress node 10 is operable to extract appropriate keys from a received packet, input them to its load balancing algorithm, and place the result in an entropy label 18b as part of the MPLS label stack pushed onto a packet 18. As shown in FIG. 1, the packet 18 may further include an EP-SID 18a, application label 18c and payload 18d. The EP-SID 18a is used as a transport label by the ingress node 10. The entropy label 18b carries load balancing information and is not used for forwarding decisions. The transit nodes 12 may perform load balancing based on the entropy label 18b or may use one or more labels in the packet's label stack as specified keys in the transit node's load balancing algorithm (such as a hash function configured to operate on the specified label keys), which avoids deep packet inspection. All or most of the nodes in the network may use the label stack for hashing.

One or more nodes are configured to perform Segment Routing, which specifies a path that the packet 18 will take through the network using a stack of segment identifiers (SIDs). A node steers a packet through a controlled set of instructions called segments by prepending the packet with a Segment Routing header. Segment Routing may be directly applied to the MPLS data plane. A prefix segment identifier (SID) identifies a segment routing tunnel leading to the destination represented by a prefix. The prefix SID may be, for example, a segment ID that contains an IP address prefix calculated by IGP in a service provider core network, for example. Prefix SIDs are globally unique. A node SID is a special form of prefix SID that contains the loopback address of the node as the prefix. It may be advertised as an index into the node specific SR Global Block (SRGB). As described below, the Entropy Prefix Segment Identifier (EP-SID) provides this function as a node identifier.

In addition to serving as a node identifier, the EP-SID also acts as an entropy label identifier. This eliminates the need for an ELI and helps to significantly reduce the label stack size in segment routing networks or duplicate the number of entropy labels used per SR stack for older platforms that have low RLD.

A new prefix segment identifier may be advertised as an EP-SID for each segment routing node. As shown in FIG. 1, the EP-SID may be associated with (mapped to) the same loopback to which the traditional prefix SID was assigned or it may be associated with a different loopback for operational purposes. The ingress node 10 uses the EP-SID 18a when the entropy label 18b will be included in the label stack and pushes the entropy label beneath (below) the EP-SID. In one or more embodiments, no changes are needed to transit node behavior. As described in detail below, forwarding may be performed with PHP disabled or with double POP on PHP.

It is to be understood that the network devices and topology shown in FIG. 1, and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks.

Those skilled in the art will understand that any number of nodes, devices, links, etc. may be used in the computer network and that the topology shown in FIG. 1 is a simplified topology. Embodiments described herein may apply to any network configured within, for example, an Autonomous System (AS) or area, or throughout multiple Autonomous Systems or areas, or across a WAN, etc. The embodiments may be used, for example, in EVPNs (Ethernet Virtual Private Networks), L2VPNs (Layer 2 Virtual Private Networks), SR-TE (Segment Routing-Traffic Engineering), or any other applications. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
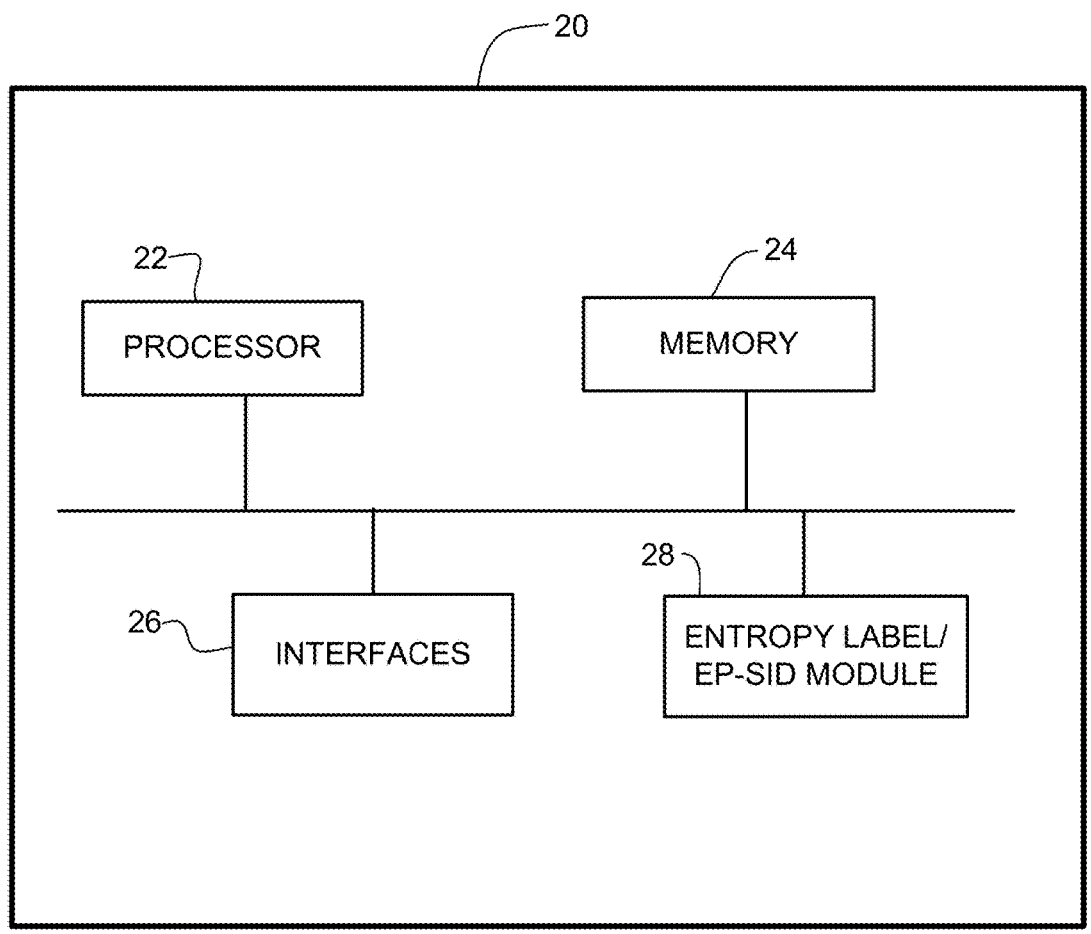
FIG. 2 depicts an example of a network device useful in implementing embodiments described herein.

FIG. 2 illustrates an example of a network device 20 that may be used to implement the embodiments described herein. In one embodiment, the network device 20 is a programmable machine that may be implemented in hardware, software, or any combination thereof. The network device 20 includes one or more processor 22, memory 24, network interfaces 26, and entropy label/EP-SID module 28.

Memory 24 may be a volatile memory or non-volatile storage, which stores various applications, operating systems, modules, and data for execution and use by the processor 22. For example, components of the EL/EP-SID module 28 (e.g., code, logic, database, etc.) may be stored in the memory 24. Memory 24 may also include an SR database, routing table (e.g., routing information base (RIB)), forwarding table (e.g., forwarding information base (FIB), LFIB (Label Forwarding Information Base)), or any other data structure for use in routing or forwarding packets. The network device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowchart of FIG. 3. The network device 20 may include any number of processors 22.

The network interfaces 26 may comprise any number of interfaces (linecards, ports) for receiving data or transmitting data to other devices. The network interface 26 may include, for example, an Ethernet interface for connection to a computer or network.

The EL/EP-SID module 28 (e.g., code, logic, firmware, software) may be operable to assign, store, POP, or SWAP the EP-SID (depending on whether the node is an ingress, transit, or egress node) and may also comprise components operable to generate the entropy label, associate the EP-SID to the entropy label, assign an algorithm to the EP-SID, generate a label stack (e.g., push entropy label behind EP-SID), and the like.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
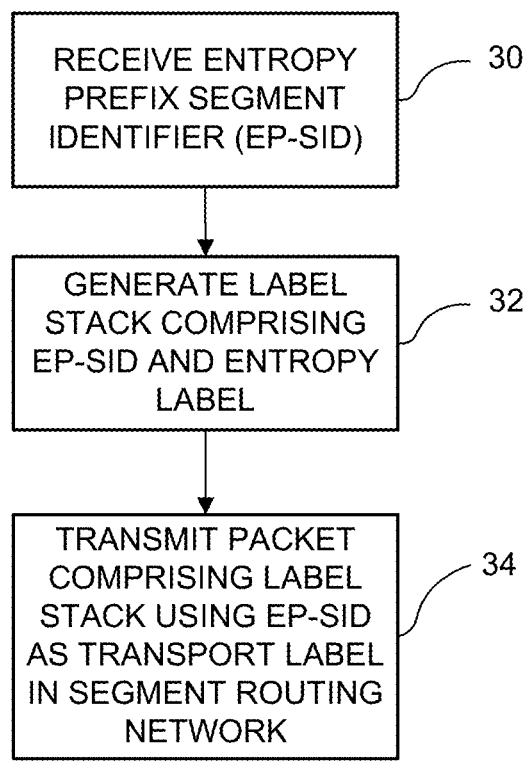
FIG. 3 is a flowchart illustrating an overview of a process for using an entropy prefix segment identifier with an entropy label in a segment routing network, in accordance with one embodiment.

FIG. 3 is a flowchart illustrating an overview of a process for enabling entropy label in Segment Routing networks using an Entropy Prefix Segment Identifier (EP-SID), in accordance with one embodiment. At step 30, an ingress node in an SR network (e.g., PE router 10 in FIG. 1) receives an entropy prefix segment identifier from a remote node (e.g., EP-SID assigned and advertised by egress node 14). The ingress node 10 may also assign and advertise an EP-SID for its own loopback as shown in FIG. 1. The ingress node 10 may perform hashing on various key fields and populate the entropy label, which eliminates the need for transit nodes 12 to perform DPI for load balancing. The ingress node 10 generates a label stack comprising the entropy prefix segment identifier 18a (received from remote node) and an entropy label 18b beneath the entropy prefix segment identifier (step 32) (FIGS. 1 and 3), and transmits a packet 18 comprising the label stack using the entropy prefix segment identifier as a transport label and an entropy label identifier (step 34).

It is to be understood that the flowchart shown in FIG. 3 and described above is only an example and that steps may be added, combined, removed, or modified, without departing from the scope of the embodiments.

Referring again to FIG. 1, as previously noted the EP-SID may be associated with the same loopback to which a traditional Prefix SID was assigned (as illustrated at (A) above the network in FIG. 1) or the EP-SID may be associated with a different loopback (as illustrated at (B) below the network in FIG. 1).

In addition to the Node (or Prefix) identifier, each node assigns an additional Segment ID as Entropy Prefix SID. As shown in FIG. 1 for the example with EP-SID mapped to same loopback (Loopback 0), PE2 assigns 16002 as Prefix SID and 17002 as EP-SID for the same prefix 10.1.2.2.

Figure 4:
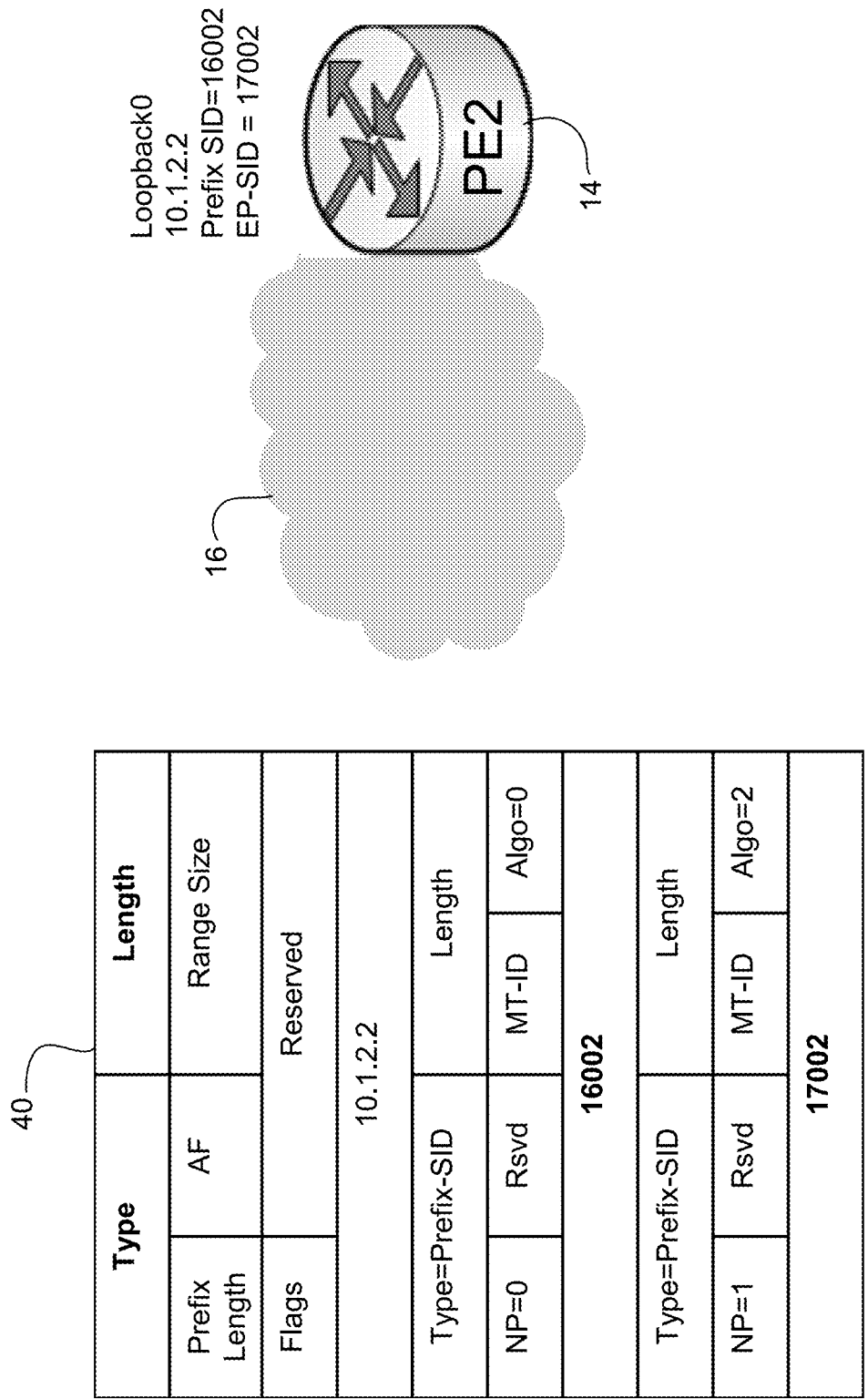
FIG. 4 illustrates an advertisement for an entropy prefix segment identifier with a same loopback as a prefix segment identifier, in accordance with one embodiment.

FIG. 4 illustrates an example of an IGP advertisement 40 using the same loopback. In this example, PE2 advertises a Prefix Range TLV with different Prefix-SID Sub-TLV. Prefix SID 16002 has NP=0 (No-PHP flag) and Algo (algorithm)=0 (SPT) and EP-SID 17002 has NP=1 and Algo=2. Advertisement with the same loopback may be used to avoid address depletion.

Figure 5:
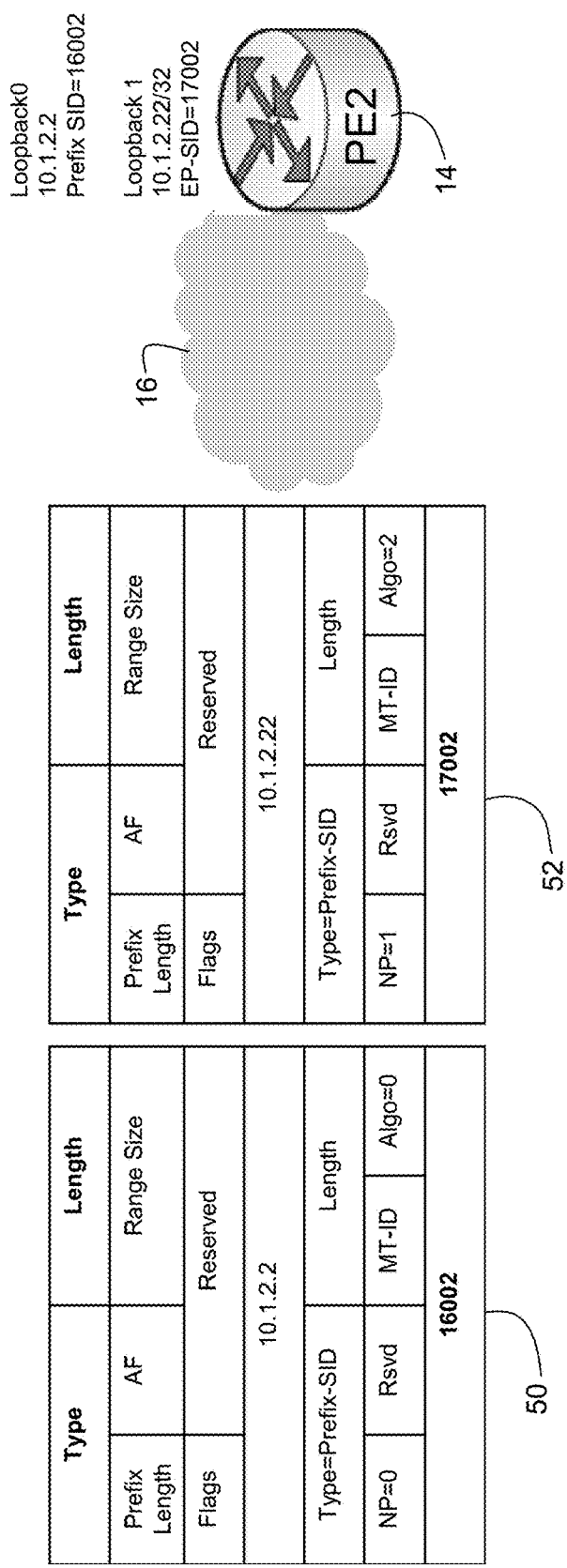
FIG. 5 illustrates an advertisement for an entropy prefix segment identifier with a different loopback from a prefix segment identifier, in accordance with one embodiment.

FIG. 5 illustrates IGP advertisements 50, 52 with different loopbacks. In this example PE2 assigns 16002 as Prefix SID for Loopback 0 (10.1.2.2) and 17002 as EP-SID for Loopback 1 (10.1.2.22). PE2 advertises 16002 with Algo=0 (50) and 17002 with a new algorithm (Algo=2) (52), which has a semantic of push entropy label beneath EP-SID.

Figure 6:
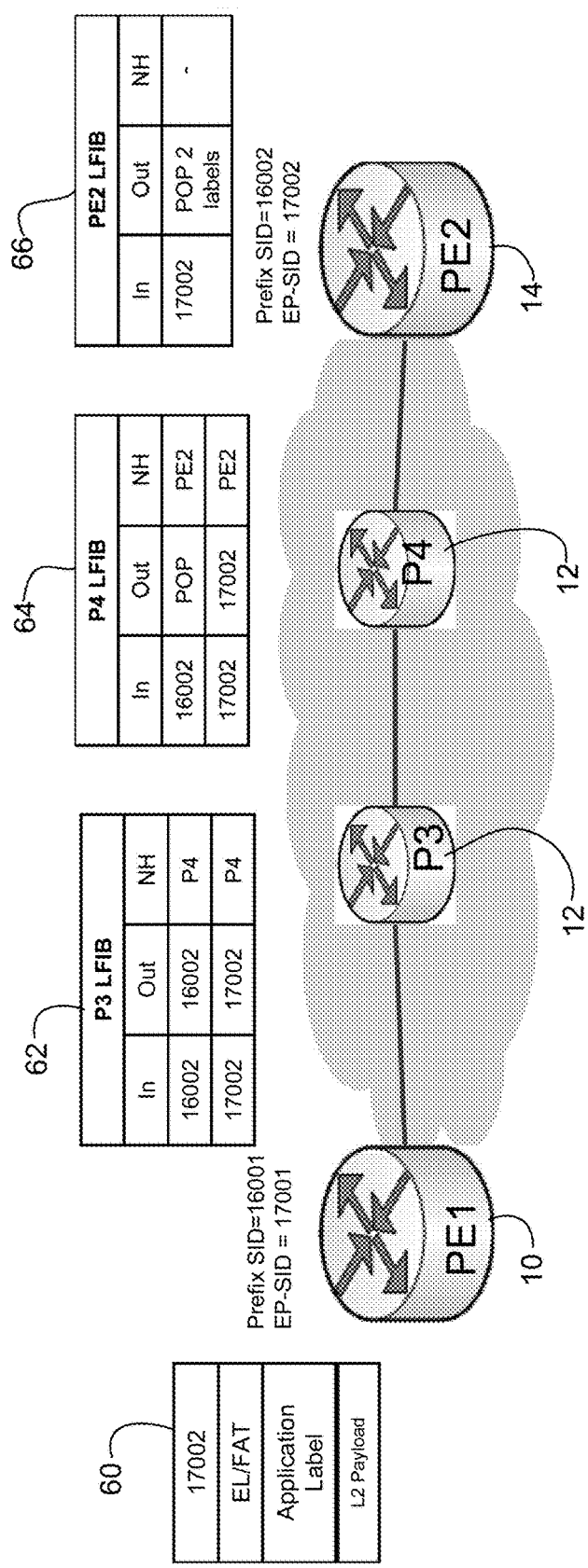
FIG. 6 illustrates forwarding using an entropy prefix segment identifier with PHP (Penultimate Hop Popping) disabled, in accordance with one embodiment.

As previously noted, forwarding may be performed with PHP (Penultimate Hop Popping) disabled or with double POP on PHP, for example. FIG. 6 illustrates node behavior using EP-SID with PHP disabled. A label stack is shown at ingress node 10 (PE1). Packet 60 includes label 17002, entropy label/FAT (Flow Aware Transport), application label, and L2 (layer 2) payload. The ingress node 10 uses EP-SID as a transport label if an entropy label is to be included in the stack. There are no changes to transit node 12 behavior. The Label Forwarding Information Base (LFIB) 62 at transit node P3 includes labels 16002 and 17002 for next-hop node P4. LFIB 64 at transit node P4 includes a POP for the prefix ID 16002 and label 17002 for next-hop node PE2. The forwarding action at the transit nodes 12 is SWAP with no PHP, as PHP is disabled for EP-SID in this example. The egress node PE2 POPs 2 labels (EP-SID and underlying entropy label) as shown at PE2 LFIB 66.

Figure 7:
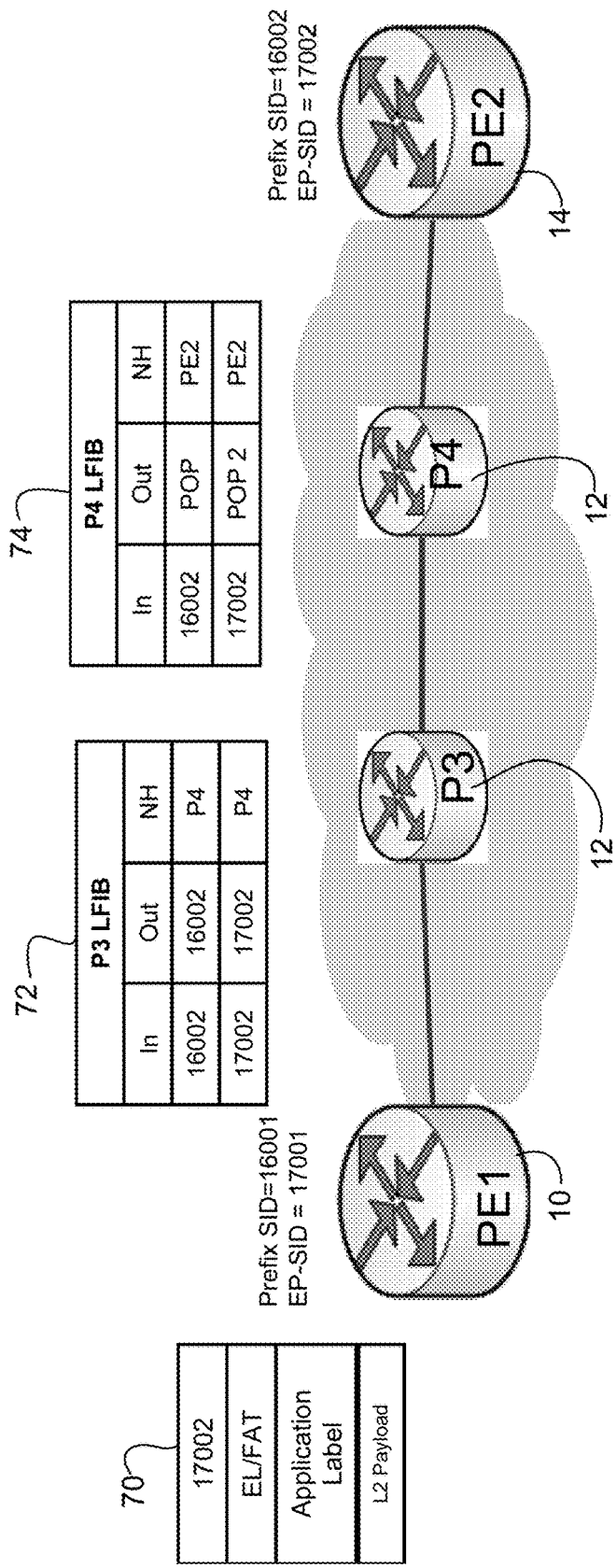
FIG. 7 illustrates forwarding using an entropy prefix segment identifier with double POP on PHP, in accordance with one embodiment.

FIG. 7 illustrates an example for EP-SID with double POP on PHP. The ingress node PE1 uses EP-SID as transport label if entropy label is to be included in the stack as shown at 70. There are no changes on transit (non-PHP) node 12, as shown at P3 LFIB 72. PHP node P4 will POP two labels, as shown at P4 LFIB 74. There are no changes at the egress node PE2.

Figure 8:
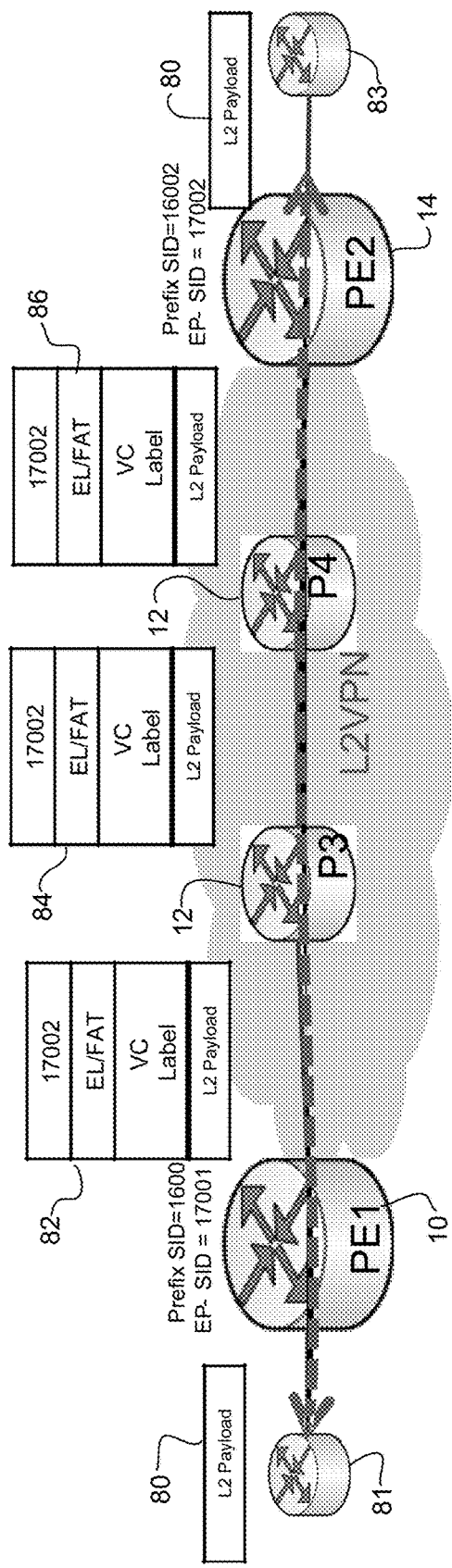
FIG. 8 illustrates an EVPN/L2VPN (Ethernet Virtual Private Network/Layer 2 Virtual Private Network) example using an entropy prefix segment identifier with PHP disabled.

FIG. 8 illustrates an example use case with EVPN/L2VPN (Ethernet Virtual Private Network/Layer 2 Virtual Private Network) for sending L2 traffic from PE1 to PE2 with PHP disabled. The L2 payload 80 is received from source node 81 at PE1. PE1 pushes VC (Virtual Circuit) label, the entropy label, and EP-SID, as shown at packet 82. Transit node P3 uses the entire label for hashing and swaps 17002 to 17002 as shown at packet 84. Transit node P4 uses the entire label for hashing and swaps 17002 to 17002 as shown at packet 86. PE2 POPs (pops) two labels (17002 and entropy label) and uses VC label to forward the L2 payload 80 to destination node 83.

Figure 9:
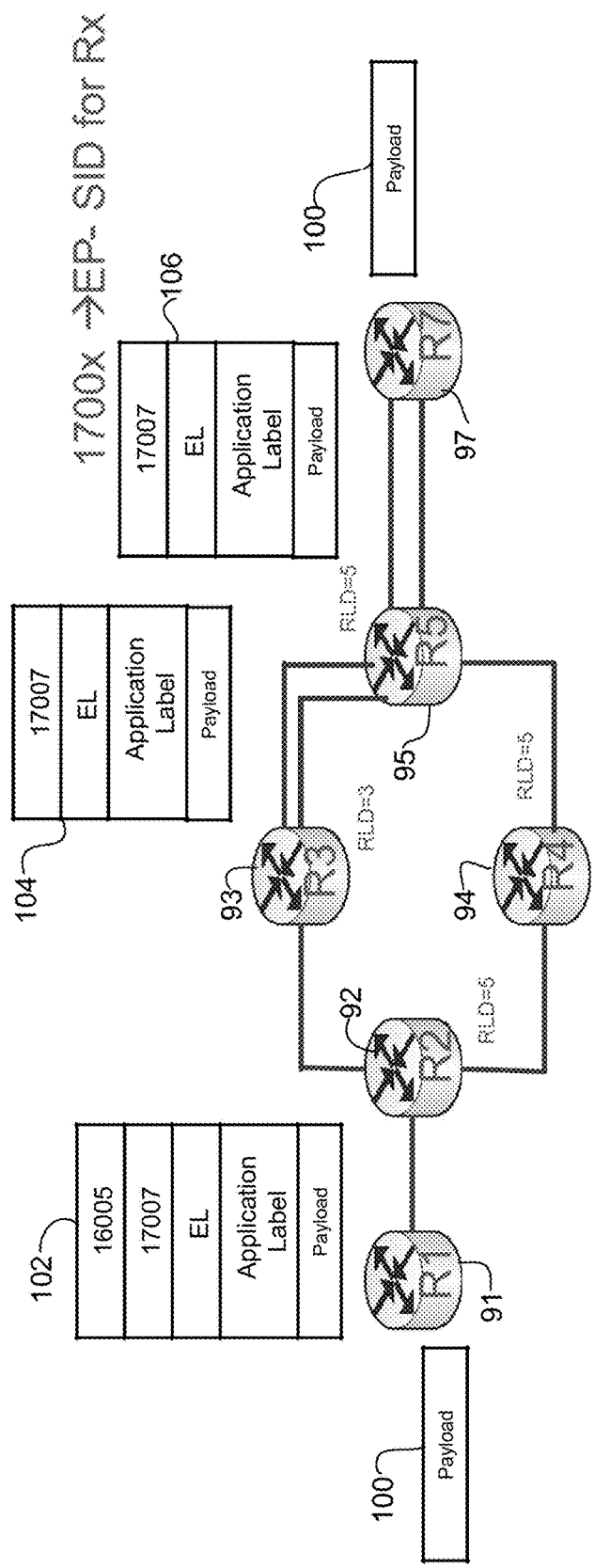
FIG. 9 illustrates an SR-TE (Segment Routing-Traffic Engineering) example using an entropy prefix segment identifier with PHP disabled.

FIG. 9 illustrates an SR-TE (Segment Routing—Traffic Engineering) example with PHP disabled. The network includes a plurality of nodes 91, 92, 93, 94, 95, 97 (R1, R2, R3, R4, R5, R7, respectively). In this example, R1 sends traffic while avoiding R4. A combination of Prefix SID and EP-SID helps to significantly reduce the label stack size (i.e., from seven to four). Payload 100 is received at R1. R1 pushes the label stack as per the algorithm (102). R2 swaps the top label. R3 POPs the top label (Prefix SID 16005) (104). R5 swaps the top label (EP-SID) (106). R7 POPs two labels (EP-SID and entropy label) and uses the application label to forward the payload 100.

Figure 10:
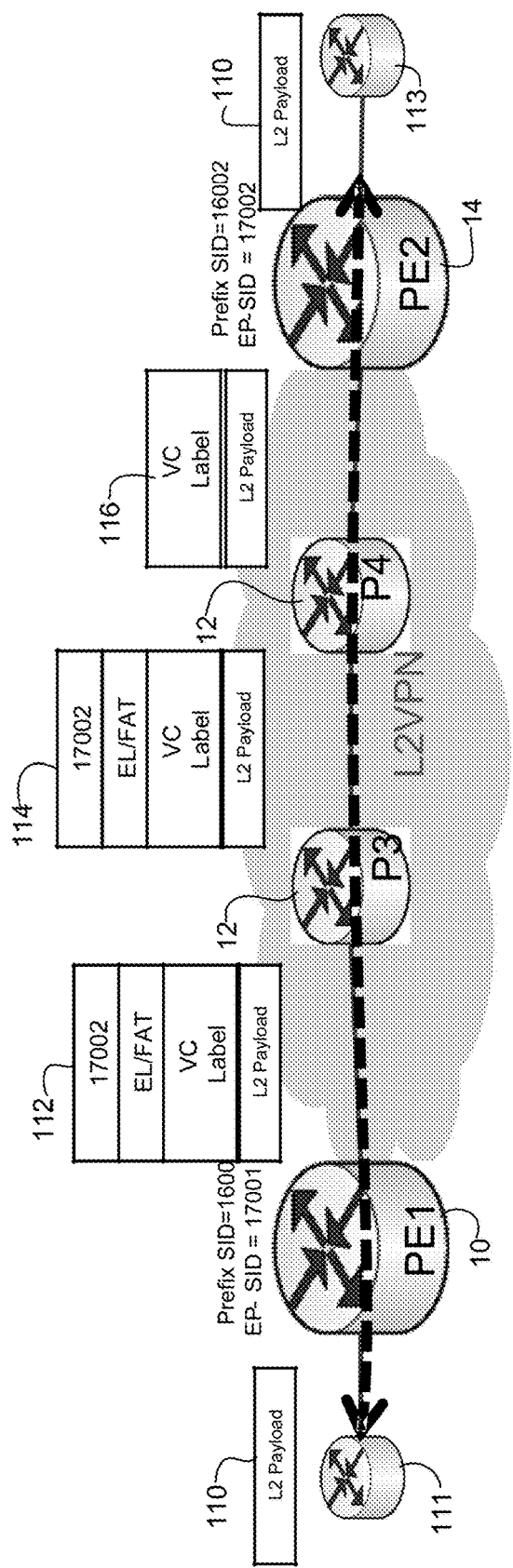
FIG. 10 illustrates an EVPN/L2VPN example using an entropy prefix segment identifier with double POP on PHP.

FIG. 10 illustrates an EVPN/L2VPN use case example with double POP on PHP (node P4). PE1 receives L2 payload 110 from source 111 and sends the L2 traffic to egress node PE2. Ingress node PE1 pushes a VC label, entropy label, and EP-SID onto the label stack (112). Transit node PE3 uses the entire label for hashing and swaps 17002 to 17002 (114). Transit node P4 uses the entire label for hashing, POPs two labels (EP-SID and entropy label), and forwards the packet to PE2 (116). Egress node PE2 uses the VC label to forward the L2 payload 110 to destination 113.

Figure 11:
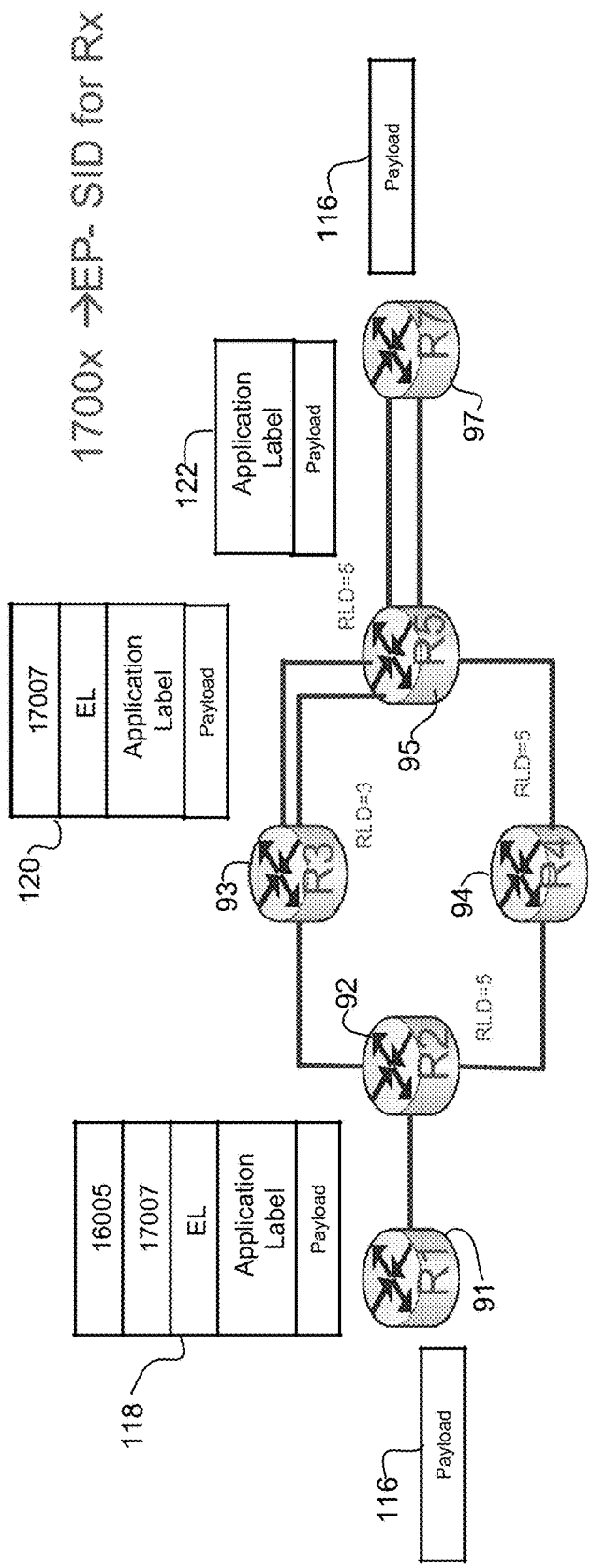
FIG. 11 illustrates an SR-TE example using an entropy prefix segment identifier with double POP on PHP.

FIG. 11 illustrates an SR-TE example with double POP on PHP. In this example R1 sends traffic (payload 116) to R7 while avoiding node R4. Node R1 pushes the label as per algorithm and generates label stack (118). Node R2 swaps the top label. Node R3 POPs the top label (Prefix-SID) (120). Node R5 POPs two labels (EP-SID and entropy label) (122). R7 uses the application label to forward payload 116.

As can be observed from the foregoing, one or more of the embodiments described herein may provide one or more advantages. For example, depth may be saved by not using an explicit label just to indicate entropy (ELI). Also, one or more embodiments may optimize the entropy label location in a segment routing environment. The embodiments may allow for more entropy labels for scenarios with low overall network RLD.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
receiving at an ingress node in a segment routing network, an entropy prefix segment identifier;
generating at the ingress node, a label stack comprising the entropy prefix segment identifier and an entropy label beneath the entropy prefix segment identifier; and
transmitting at the ingress node, a packet comprising the label stack using the entropy prefix segment identifier as a transport label and an entropy label identifier;
wherein the entropy label is a load balancing label.

2. The method of claim 1 wherein the entropy prefix segment identifier is advertised with a different algorithm than a prefix segment identifier.

3. The method of claim 2 wherein said algorithm instructs the ingress node to push the entropy label beneath the entropy prefix segment identifier.

4. The method of claim 1 wherein the entropy prefix segment identifier is associated with a same loopback as a related prefix segment identifier.

5. The method of claim 1 wherein the entropy prefix segment identifier is associated with a different loopback than a related prefix segment identifier.

6. The method of claim 1 wherein the entropy prefix segment identifier is advertised by an egress node in an IGP (Interior Gateway Protocol) advertisement.

7. The method of claim 1 wherein PHP (Penultimate Hop Popping) is disabled and an egress node is configured to pop the entropy prefix segment identifier and the entropy label upon receiving the packet.

8. The method of claim 1 wherein a segment of the segment routing network is configured for double pop on PHP (Penultimate Hop Popping) and wherein a PHP node is operable to pop the entropy prefix segment identifier and the entropy label.

9. An apparatus comprising:
an interface for receiving at an ingress node in a segment routing network, an entropy prefix segment identifier;
a processor for generating a label stack comprising the entropy prefix segment identifier and an entropy label beneath the entropy prefix segment identifier and transmitting a packet comprising the label stack using the entropy prefix segment identifier as a transport label and an entropy label identifier; and
memory for spring the entropy prefix segment identifier;
wherein the entropy label is a load balancing label.

10. The apparatus of claim 9 wherein the entropy prefix segment identifier is received in an advertisement with a different algorithm than a prefix segment identifier.

11. The apparatus of claim 10 wherein said algorithm is configured to instruct the ingress node to push the entropy label beneath the entropy prefix segment identifier.

12. The apparatus of claim 9 wherein the entropy prefix segment identifier is associated with a same loopback as a related prefix segment identifier.

13. The apparatus of claim 9 wherein the entropy prefix segment identifier is associated with a different loopback than a related prefix segment identifier.

14. The apparatus of claim 9 wherein the entropy prefix segment identifier is advertised by an egress node in an IGP (Interior Gateway Protocol) advertisement.

15. The apparatus of claim 9 wherein PHP (Penultimate Hop Popping) is disabled and an egress node is configured to pop the entropy prefix segment identifier and the entropy label upon receiving the packet.

16. The apparatus of claim 9 wherein a segment of the segment routing network is configured for double pop on PHP (Penultimate Hop Popping) and wherein a PHP node is configured to pop the entropy prefix segment identifier and the entropy label.

17. Logic encoded on one or more non-transitory computer readable media for execution and when executed operable to:
 process at an ingress node in a segment routing network, an entropy prefix segment identifier;
 generate a label stack comprising the entropy prefix segment identifier and an entropy label beneath the entropy prefix segment identifier; and
 transmit a packet comprising the label stack using the entropy prefix segment identifier as a transport label and an entropy label identifier;
 wherein the entropy label is a load balancing label.

18. The logic of claim 17 wherein the processor is operable to process the entropy prefix segment identifier advertised with a different algorithm than a prefix segment identifier and wherein said algorithm instructs the ingress node to push the entropy label beneath the entropy prefix segment identifier.

19. The logic of claim 17 wherein the ingress node is operable to transmit traffic in an EVPN/L2VPN (Ethernet Virtual Private Network/Layer 2 Virtual Private Network).

20. The logic of claim 17 wherein the ingress node is operable to transmit traffic for (SR-TE) Segment Routing-Traffic Engineering.

* * * * *